(12) United States Patent
Taubman et al.

(10) Patent No.: US 6,915,015 B1
(45) Date of Patent: Jul. 5, 2005

(54) APPARATUS FOR AND METHOD FOR SNR SCALABLE QUAD-TREE BIT-PLANE CODING

(75) Inventors: David Scott Taubman, Berkeley, CA (US); Erik Ordentlich, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/531,918

(22) Filed: Mar. 21, 2000

(51) Int. Cl.[7] .............................. G06K 9/36; H04N 7/12
(52) U.S. Cl. .................. 382/240; 382/248; 375/240.19
(58) Field of Search ................................ 382/240, 226, 382/239, 233, 232, 237, 248; 341/79; 375/240.05, 240.16, 240.19

(56) References Cited

U.S. PATENT DOCUMENTS

| | | | |
|---|---|---|---|
| 5,764,807 A | 6/1998 | Pearlman et al. | 382/240 |
| 5,886,651 A | 3/1999 | Chui et al. | 341/50 |
| 5,923,785 A | 7/1999 | Dube | 382/240 |
| 6,356,665 B1 * | 3/2002 | Lei et al. | 382/240 |

FOREIGN PATENT DOCUMENTS

WO    WO 00/10131    * 2/2000    ............. G06T/9/40

* cited by examiner

Primary Examiner—Wenpeng Chen

(57) ABSTRACT

An apparatus for and a method of coding the bit-planes of an array of numbers. The values in the array of numbers are converted to binary. The binary values are truncated to a predetermined level of accuracy. The number of bit-planes is determined based on the largest absolute value. A tree structured description of the array is generated based on a modified quad-tree coding technique. An SNR (signal to noise ratio) scalable encoding of the significance information for each bit-plane is generated by describing new branches and leaves of the tree corresponding to each bit-plane in a bottom-up-depth-first manner. An encoding of refinement information for each bit-plane is generated. A SNR scalable description of the array is generated by concatenating the encoding of the significance information and the refinement information generated for each bit-plane.

14 Claims, 16 Drawing Sheets

|       | 1  | 2 | 3  | 4 | 5 | 6 | 7 | 8 |
|-------|----|---|----|---|---|---|---|---|
| $c_{i,j}$   1 | 10 | 0 | 0  | 6 | 0 | 0 | 0 | 0 |
| 2     | 0  | 0 | 0  | 0 | 0 | 0 | 0 | 0 |
| 3     | 0  | 3 | 0  | 0 | 0 | 0 | 0 | 0 |
| 4     | 0  | 1 | -9 | 0 | 0 | 0 | 0 | 0 |
| 5     | 0  | 0 | 0  | 0 | 0 | 0 | 0 | 0 |
| 6     | 0  | 0 | 0  | 0 | 0 | 0 | 0 | 0 |
| 7     | 0  | 0 | 0  | 0 | 0 | 0 | 0 | 0 |
| 8     | 0  | 0 | 0  | 0 | 0 | 0 | 0 | 0 |

FIG. 3

| DECIMAL | BINARY | | | | |
|---|---|---|---|---|---|
| | SGN | $b^3$ | $b^2$ | $b^1$ | $b^0$ |
| $C_{1,1}=10$ | | 1 | 0 | 1 | 0 |
| $C_{1,4}=6$ | | 0 | 1 | 1 | 0 |
| $C_{3,2}=3$ | | 0 | 0 | 1 | 1 |
| $C_{4,2}=1$ | | 0 | 0 | 0 | 1 |
| $C_{4,3}=-9$ | - | 1 | 0 | 0 | 1 |

|   | 1 | 2 | 3 | 4 | 5 | 6 | 7 | 8 |
|---|---|---|---|---|---|---|---|---|
| 1 | 1 | 0 | 0 | 0 | 0 | 0 | 0 | 0 |
| 2 | 0 | 0 | 0 | 0 | 0 | 0 | 0 | 0 |
| 3 | 0 | 0 | 0 | 0 | 0 | 0 | 0 | 0 |
| 4 | 0 | 0 | 1 | 0 | 0 | 0 | 0 | 0 |
| 5 | 0 | 0 | 0 | 0 | 0 | 0 | 0 | 0 |
| 6 | 0 | 0 | 0 | 0 | 0 | 0 | 0 | 0 |
| 7 | 0 | 0 | 0 | 0 | 0 | 0 | 0 | 0 |
| 8 | 0 | 0 | 0 | 0 | 0 | 0 | 0 | 0 |

FIG. 5A $\Delta_3 \longrightarrow$ 1 1 1 1 [0] 0 0 0 0 0 0 1 0 0 0 0 1 [1] 0 0 0 0

$R_3 \longrightarrow$ n/a

FIG. 5C $S^2(C_{i,j})$

|   | 1 | 2 | 3 | 4 | 5 | 6 | 7 | 8 |
|---|---|---|---|---|---|---|---|---|
| 1 | 1 | 0 | 0 | 1 | 0 | 0 | 0 | 0 |
| 2 | 0 | 0 | 0 | 0 | 0 | 0 | 0 | 0 |
| 3 | 0 | 0 | 0 | 0 | 0 | 0 | 0 | 0 |
| 4 | 0 | 0 | 1 | 0 | 0 | 0 | 0 | 0 |
| 5 | 0 | 0 | 0 | 0 | 0 | 0 | 0 | 0 |
| 6 | 0 | 0 | 0 | 0 | 0 | 0 | 0 | 0 |
| 7 | 0 | 0 | 0 | 0 | 0 | 0 | 0 | 0 |
| 8 | 0 | 0 | 0 | 0 | 0 | 0 | 0 | 0 |

FIG. 6A $\Delta_2$ → 0 0 0 0 0 0 0 0 0 0 1 0 1 [0] 0 0 0 0 0 0 0

|   | 1 | 2 | 3 | 4 | 5 | 6 | 7 | 8 |
|---|---|---|---|---|---|---|---|---|
| 1 | 1 | 0 | 0 | 1 | 0 | 0 | 0 | 0 |
| 2 | 0 | 0 | 0 | 0 | 0 | 0 | 0 | 0 |
| 3 | 0 | 1 | 0 | 0 | 0 | 0 | 0 | 0 |
| 4 | 0 | 0 | 1 | 0 | 0 | 0 | 0 | 0 |
| 5 | 0 | 0 | 0 | 0 | 0 | 0 | 0 | 0 |
| 6 | 0 | 0 | 0 | 0 | 0 | 0 | 0 | 0 |
| 7 | 0 | 0 | 0 | 0 | 0 | 0 | 0 | 0 |
| 8 | 0 | 0 | 0 | 0 | 0 | 0 | 0 | 0 |

FIG. 7A $\Delta_1 \longrightarrow$ 0 0 0 0 0 0 0 0 0 0 0 0 0 1 0 1 [0] 0 0 0 0 0

$R_1 \longrightarrow$ 1 1 0

FIG. 7C $S^0(C_{i,j})$

|   | 1 | 2 | 3 | 4 | 5 | 6 | 7 | 8 |
|---|---|---|---|---|---|---|---|---|
| 1 | 1 | 0 | 0 | 1 | 0 | 0 | 0 | 0 |
| 2 | 0 | 0 | 0 | 0 | 0 | 0 | 0 | 0 |
| 3 | 0 | 1 | 0 | 0 | 0 | 0 | 0 | 0 |
| 4 | 0 | 1 | 1 | 0 | 0 | 0 | 0 | 0 |
| 5 | 0 | 0 | 0 | 0 | 0 | 0 | 0 | 0 |
| 6 | 0 | 0 | 0 | 0 | 0 | 0 | 0 | 0 |
| 7 | 0 | 0 | 0 | 0 | 0 | 0 | 0 | 0 |
| 8 | 0 | 0 | 0 | 0 | 0 | 0 | 0 | 0 |

FIG. 8A $\Delta_0 \longrightarrow$ 0 0 0 0 0 0 0 0 0 0 0 0 0 1 [0] 0 0 0 0 0 0

$R_0 \longrightarrow$ 0 0 1 1

FIG. 8C

APPARATUS FOR AND METHOD FOR SNR SCALABLE QUAD-TREE BIT-PLANE CODING

BACKGROUND OF THE INVENTION

1. Field of Invention

The present invention relates generally to the field of computer coding and pertains more particularly to coding the bit-planes of an array of numbers.

2. Discussion of the Prior Art

With the advent of the computer and the Internet, man is living increasingly in an information age. The storage and transmission of information or data has taken on a lab heightened importance. Unfortunately, storage space and transmission bandwidth are not unlimited. Modem computer systems have become increasingly graphics intensive. Dedicated special purpose memories and hardware have been developed to meet this need. New and improved graphics file formats and communication protocols are being developed as well. As graphics technologies and products become more prevalent in consumer areas, slim profit margins are demanding the utmost efficiencies. Compression is necessary to achieve efficiency in database representation to conserve disk storage, system memory, cache memory, and special purpose memories. Additional savings can be achieved by conserving bus bandwidths, which becomes more critical with unified computer architectures where graphics and system memory are one and the same.

Data compression is often used to reduce the cost of storing large data files on computers as well as to reduce the time for transmitting large data files between computers. Several compression techniques exist. One technique is to transform the data from its original form into a second form which is easier to manipulate. In the so-called "transform methods" data is transformed into coefficients that represent the data in a frequency domain. Coefficients may be quantized without significantly affecting the quality of data that is reconstructed. This is a form of lossy compression. Lossy compression refers to compression with some effect on the rendered output. Redundancy in the coefficients may then be reduced or eliminated without affecting the quality of the reconstructed data. This is a form of lossless compression. Lossless compression refers to compression with no effect on the rendered output.

One well known class of transforms are Wavelet transforms. The Wavelet transforms may be used to perform subband decomposition and produce coefficients that describe the data in a hierarchical multiscale representation. Wavelet transforms have proven useful for the compression of images and the analysis of signals. They have been proposed as the transform for the emerging JPEG-2000 standard.

Among the advantages of the Wavelet transforms is that the transform coefficients can be ordered in a hierarchical structure and transmitted in an "embedded bitstream." The embedded bitstream has a property whereby prefixes of the bitstream yield a continuum of lower rate descriptions of the data at the highest possible levels of quality. If the embedded bitstream is truncated during transmission of image data, for instance, the information already transmitted will allow an entire image to be reconstructed. The quality of the reconstructed image is dependent upon the amount of information transmitted. As additional information is transmitted, the quality of the reconstructed image is improved. If the entire bitstream is transmitted without truncation, a lossless or near-lossless image can be reconstructed. If an embedded bitstream is truncated, a complete image of reduced quality can be reconstructed from the transmitted bits. In contrast, truncation of a non-embedded transmission might only allow several rows of an image to be reconstructed.

The transmission just described is often referred to as a progressive-by-quality or SNR (signal to noise ratio) scalable image transmission. The coefficients are converted to binary and described by bit-planes. The most significant coefficient bits, that is, the coefficient bits conveying the most important information, are transmitted first. The lesser significant coefficient bits are then transmitted in order of decreasing importance with the least significant coefficient bits being transmitted last.

Another type of transmission is often referred to as progressive-by-resolution transmission. The progressive-by-resolution transmission involves ordering the coefficients according to different levels of image resolution. The different levels are identified by markers in the embedded bitstream. A computer may use the markers to parse the bitstream and transmit the data for the coefficients corresponding to a resolution that is specified by the receiving computer. The receiving computer can then reconstruct an image according to the specified resolution.

A number of coding algorithms have been proposed for ordering the description of the transform coefficients such that the retained number of bits of the description can produce the best quality image. For example, algorithms have been proposed by Shapiro, known as the "Zerotree" algorithm, and an improvement thereon by Said-Pearlman, known as the "SPIHT" algorithm, among others. However, there are a number of problems associated with the Zerotree based algorithms. Among these problems is that Zerotree coders rely on the use of a complex arrangement of lists and pointers. Further, the Zerotree coders minimize image distortion only at bit-plane boundaries. As long as the transmission is truncated at a bit-plane boundary, the image distortion will be minimized. However, if a transmission is truncated at a point other than a bit-plane boundary, the image distortion will not be minimized.

A definite need exists for a system having an ability to meet the efficiency requirements of graphics intensive computer systems. In particular, a need exists for a system which is capable of ordering the description of the transform coefficients in a simple and fast manner. Ideally, such a system would have a lower cost and a higher productivity than conventional systems. With a system of this type, system performance can be enhanced. A primary purpose of the present invention is to solve this need and provide further, related advantages.

SUMMARY OF THE INVENTION

An apparatus for and a method of coding the bit-planes of an array of numbers is disclosed. The values in the array of numbers are converted to binary. The binary values are truncated to a predetermined level of accuracy. The number of bit-planes is determined based on the largest absolute value. A tree structured description of the array is generated based on a modified quad-tree coding technique. An SNR scalable encoding of the significance information for each bit-plane is generated by describing new branches and leaves of the tree corresponding to each bit-plane in a bottom-up-depth-first manner. An encoding of refinement information for each bit-plane is generated. A SNR scalable description of the array is generated by concatenating the encoding of the significance information and the refinement information generated for each bit-plane.

BRIEF DESCRIPTION OF THE DRAWING

The above and other objects and advantages of the present invention will be more readily appreciated from the following detailed description when read in conjunction with the accompanying drawing, wherein:

FIG. 3 is an example of a square array representing subband SB8 from FIG. 2;

FIG. 4 is a table illustrating the binary conversion of the decimal values of the non-zero coefficients from FIG. 3;

FIG. 5A is an example of a square array of significance information for the highest bit-plane of the coefficients from FIG. 3;

FIG. 5C is a table illustrating the encoding of the significance information and the refinement information for FIGS. 5A and 5B;

FIG. 6A is an example of a square array of significance information for the second highest bit-plane of the coefficients from FIG. 3;

FIG. 6C is a table illustrating the encoding of the significance information and the refinement information for FIGS. 6A and 6B;

FIG. 7A is an example of a square array of significance information for the third highest bit-plane of the coefficients from FIG. 3;

FIG. 7C is a table illustrating the encoding of the significance information and the refinement information for FIGS. 7A and 7B;

FIG. 8A is an example of a square array of significance information for the lowest bit-plane of the coefficients from FIG. 3;

FIG. 8C is a table illustrating the encoding of the significance information and the refinement information for FIGS. 8A and 8B.

DETAILED DESCRIPTION OF THE PREFERRED EMBODIMENTS

Figure 1:
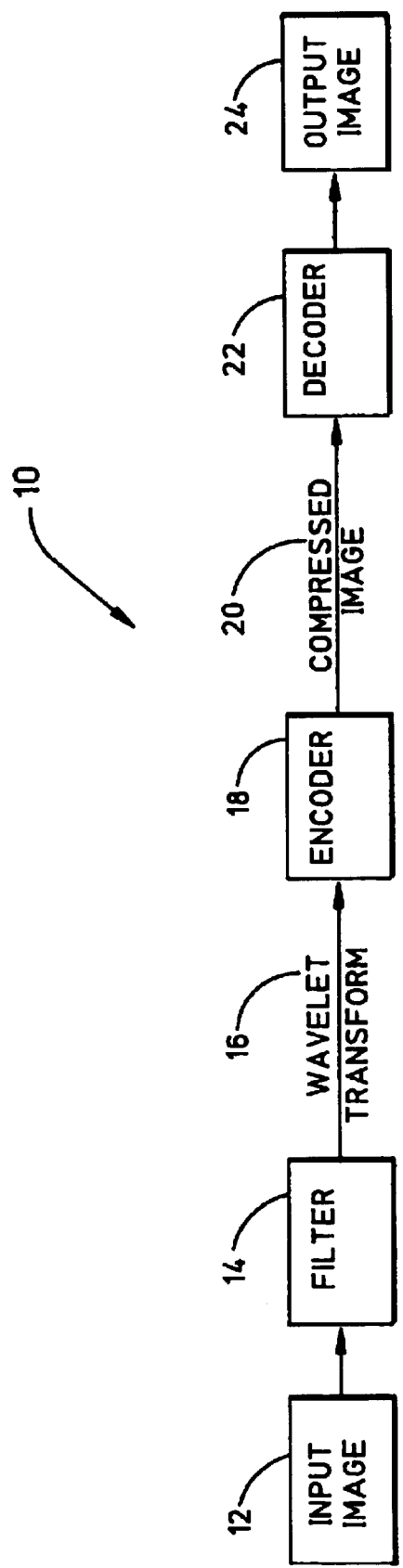
FIG. 1 is a block diagram of a coding system according to one embodiment of the present invention.

Turning first to FIG. 1, a block diagram of a coding system 10 according to one embodiment of the present invention is shown. The coding system 10 operates on an input image 12 which is decomposed using a standard sampling filter 14. Under a Wavelet transform, the filter 14 decomposes the image into four frequency subbands which will be further described below. The output of the filter 14 is termed a Wavelet transform 16 which is processed by an encoder 18 to generate a compressed image 20. The encoder 18 efficiently generates the compressed image 20 using a modified quad-tree coding technique described below. The compressed image 20 may be decompressed using a decoder 22. The decoder 22 similarly utilizes an inverse of the modified quad-tree coding technique to produce an output image 24.

Figure 2:
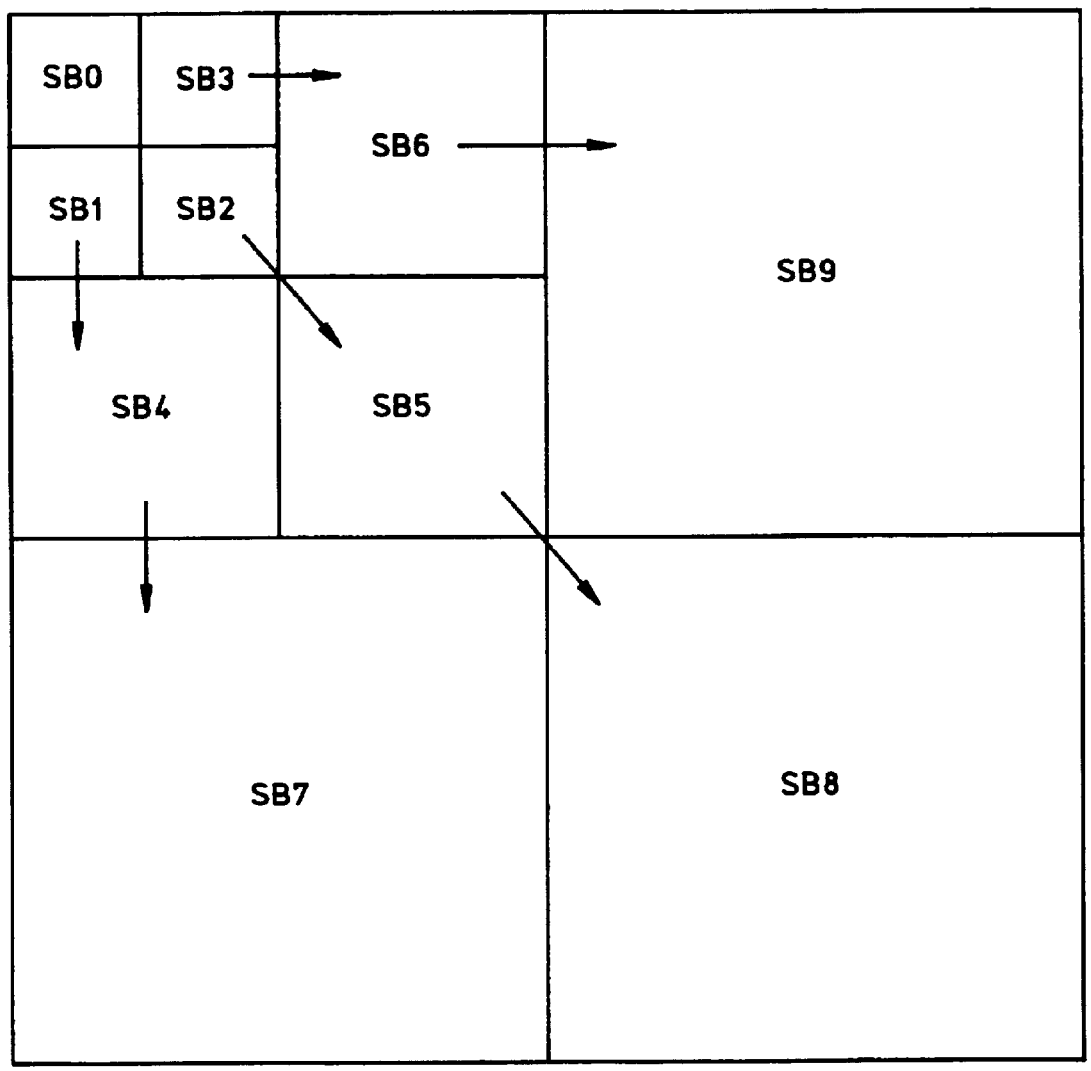
FIG. 2 is a graphical representation of a hierarchical subband decomposition of a sixteen pixel by sixteen pixel image.

FIG. 2 shows a graphical representation of a hierarchical subband decomposition of a sixteen pixel by sixteen pixel image. A Wavelet transform may be used to perform the subband decomposition. The filter 14 of FIG. 1 is such an example. At a first level of decomposition, image data, that is, luminance or chrominance data of an image, is filtered by high pass and low pass filters, both horizontally and vertically. Then each of the resulting bands is subsampled by a factor of two, both horizontally and vertically. At the first level, the resulting subbands are as follows: a low pass horizontal, low pass vertical subband; a high pass horizontal, low pass vertical subband (SB9); a high pass horizontal, high pass vertical subband (SB8); and a low pass horizontal, high pass vertical subband (SB7). Each subband is one-quarter the size of the original image. In this case, at the first level, each subband will contain sixty-four coefficients arranged in a square array or matrix pattern.

Each additional decomposition is performed on the low pass horizontal, low pass vertical subband generated at the previous level of decomposition. The results are the SB4–SB6 subbands as shown and a new low-low band. In this case, at the second level, each subband will contain sixteen coefficients arranged in a square array. Further, the third decomposition would be performed on the new low-low band. The results are the SB0–SB3 subbands as shown. In this case, at the third level, each subband will contain four coefficients arranged in a square array. Three levels of decomposition are performed to produce the three-level subband decomposition shown. The resulting array of coefficients in this case is sixteen by sixteen having 256 entries. In actual practice, the number of levels of decomposition will depend on the image size with the larger the image the larger the number of decompositions and the larger the array of coefficients. The resulting array quickly becomes unwieldy for manual analysis.

The coarsest frequency information may be found in the lowest frequency subband SB0. The finest frequency information may be found in the highest frequency subband SB8. Parent-child dependencies are shown with the arrows pointing from the subband of the parent nodes to the subband of the child nodes. In a Wavelet transform, the magnitude of the coefficients become smaller as the frequency increases.

With reference to FIG. 3, an example of a square array representing subband SB8 from FIG. 2 is shown. The square array is filled with example coefficients and the rows and columns are labeled 1–8 from top to bottom and from left to right, respectively. In general, a coefficient will be represented as $c_{i,j}$, where i is the row and j is the column. For example, coefficient $c_{1,4}$ is shown to have a value of 6 in the array. Upon review, one will realize that many of the entries have zero values. This is simply for convenience and will not necessarily be the case. The method below will be illustrated with respect to this square array, but one of ordinary skill will realize that the method can be expanded to any size square or rectangular array as necessary. Rectangular arrays are handled by extending the rows and columns with zero entries until a square array is obtained.

Quad-tree coding is a well known technique for generating a tree structured description of a square array having binary entries. The tree is described from the root at the top to the leaves at the bottom. At depth one or the root, there is only one node. The root node corresponds to the whole square array. From depth one down, the tree repetitively splits each node into four nodes at each successively lower depth. So, at depth two, there are four nodes. At depth three, there are four, eight, twelve, or sixteen nodes depending on whether or not each node at depth two split. Not every node will split at the next depth. This splitting continues until the description is complete. The size and shape of the tree will depend in part on both the size of the square array and the values of its entries. Except for the root, these nodes are either branches or leaves. Branches correspond to four equal sized row-column aligned quadrants or sub-blocks of the square array. Branches may also be referred to as internal nodes. Only those nodes corresponding to sub-blocks containing at least one non-zero entry have branches. Leaves correspond to sub-blocks that have all zero entries in the square array or, at the lowest depth, to sub-blocks of individual entries of the square array. The lowest level leaves are labeled with the values of their corresponding array entries. The tree is typically described in a depth first fashion, starting from the root, by specifying whether the new node is a branch or a leaf.

One of ordinary skill in the art will realize that computers generally operate in binary. As a result, decimal numbers have to be converted to binary. In general, the binary representation of a decimal number will take the form of $b^{m-1}b^{m-2} \ldots b^{n}b^{n-1} \ldots b^{1}b^{0}b^{-1}b^{-2} \ldots$ where each bit b is either one or zero. For example, the decimal number 10 converts to 1010 in binary ($b^3b^2b^1b^0$). In this case, m is equal to four because the binary representation has four X bits (4−1=3). This represents full precision. If one did not need full precision, some of the bits could be ignored. For example, say one was limited to bits $b^3$ and $b^2$ in this case, still one would know that the decimal number was 8, 9, 10, or 11. In certain applications this may be enough precision. In return for less precision, the number of bits was cut in half in this case.

FIG. 4 shows a table illustrating the binary conversion of the decimal values of the non-zero coefficients from FIG. 3. One of ordinary skill will realize that for a full conversion, the sign will also need to be converted using the binary alphabet. This has been omitted for convenience. Each number has been converted using the number of bits needed for conversion of the maximum coefficient. In this case, coefficient $c_{1,1}$ has the maximum absolute value and requires four bits. As a result, even though coefficient $c_{4,2}$ only requires one bit, it is shown by way of four bits with leading zeros. Implicit in the illustration is that the precision was cut off at the decimal place. In general, the precision could be cut off at any bit position on either side of the decimal point. Zero bits greater than $b^3$ and less than $b^0$ have been ignored for convenience.

Taken together across the binary conversions, the bits at a given precision are called bit-planes. For example, the bits for $b^3$ are grouped into bit-plane three. Quad-tree coding for generating a tree structured description of a square array having binary entries is applied to these bit-planes. The tree, represented by $T_n$ where n is the number of the bit-plane, describes significance information as to which coefficients are significant relative to a particular bitplane. The bit-planes are considered from highest to lowest. The significance information for a coefficient $c_{i,j}$ is represented by $s^n(c_{i,j})$. A coefficient is said to be significant, that is, $s^n(c_{i,j})=1$, at a particular bit-plane n if one of two conditions exist. First, if the coefficient has a value of one for the first time at that bit-plane, that is, the coefficient had leading zeros in all of the higher bit-planes m−1 through n+1. Second, if the coefficient had a value of one in any of the higher bit-planes, that is, the coefficient remains significant at all bit-planes below its initial significance. Otherwise, the coefficient $c_{i,j}$ is insignificant, that is, $s^n(c_{i,j})=0$. From the definition of significance it follows that once a coefficient becomes significant at a particular bit-plane it remains significant at all lower bit-planes. This means that for all bit-planes n, $T_{n-1}$, the quad-tree description of the significance information for bit-plane n−1, can be obtained by adding branches and leaves to the leaves corresponding to zero regions, that is, zero-labeled leaves, of $T_{n-1}$. In this sense, $T_{n-1}$ is a refinement of $T_n$. The encoding of the manner in which $T_n$ should be refined to obtain $T_{n-1}$ is represented by $\Delta_n$. The sign of the corresponding coefficient is encoded with the first significant bit for that coefficient using a one to represent a negative sign and a zero to represent a positive sign. At the highest bit-plane m−1, the significance information corresponds to the values of the coefficients for that bit-plane. For each bit-plane below the highest bit-plane, the values of the coefficients which became significant at higher bit-planes constitute refinement information and the encoding of this information is represented by $R_n$.

An SNR scalable bit-stream for a square array of coefficients is obtained by concatenating the significance information $\Delta_n$ and the refinement information $R_n$ in the order $$\Delta_{m-1} R_{m-1} \Delta_{m-2} R_{m-2} \ldots \Delta_n R_n \Delta_{n-1} R_{n-1} \ldots \Delta_1 R_1 \Delta_0 R_0. \Delta_{-1} R_{-1} \Delta_{-2} R_{-2} \quad (1)$$

where $R_{m-1}$ is always an empty set. This order is valuable because it allows some image to be generated even if the transmission is truncated during the transfer of the bit-stream. For best application of the quad-tree technique to bit-plane coding, attention should be paid to the manner in which a higher tree $T_n$ is refined to obtain a lower tree $T_{n-1}$, the description of which constitutes $\Delta_{n-1}$. The order of the description can have a significant effect on the smoothness of the distortion rate behavior of the final SNR scalable bit-stream. The refinement of $T_n$ should be guided by what shall be called the embedding principle, that is, all bit-plane information should be described in order of decreasing expected distortion reduction per expected bit of description. Based on this principle, it can be shown that the result is that the significance tree should be described in a bottom-up-depth-first fashion. This means that in encoding the refinement of $T_n$ into $T_{n-1}$ the new values of the maximum depth zero-labeled leaves of $T_n$ are described first (including the signs of the newly significant coefficients). Then each new sub-tree, having new branches and leaves, growing out of each shallower zero-labeled leaf of $T_n$ is described in a depth-first fashion. The shallower zero-labeled leaves of $T_n$ are processed in order of decreasing depth. This procedure will be illustrated below with respect to the example of FIG. 3.

Figure 5B:
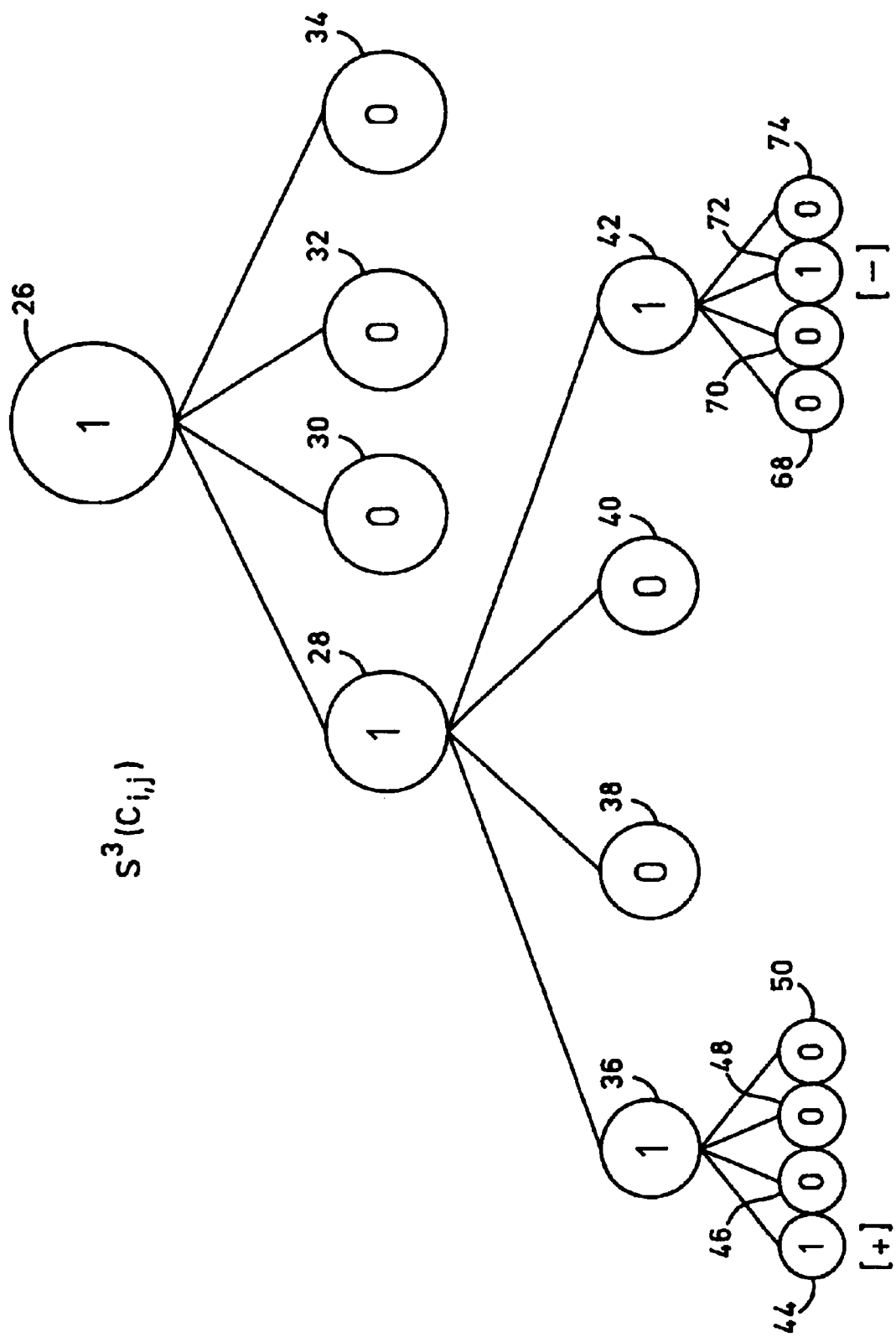
FIG. 5B is a quad-tree description of the square array of significance information of FIG. 5A.

FIG. 5A shows an example of a square array of significance information $s^n(c_{i,j})$ for the highest bit-plane of the coefficients from FIG. 3. Recall from above that at the highest bit-plane, the significance information corresponds to the values of the coefficients for that bit-plane. So, in this example $s^3(c_{i,j})$ is equal to $b^3_{i,j}$. Because of this, all of the relevant information is contained in the encoding of the significance information $\Delta_3$ and there is no refinement information $R_3$ for the highest bit-plane. A quad-tree description of the square array of significance information of FIG. 5A is shown in FIG. 5B. The resulting tree is of depth four with some of the leaves at each of the depths two, three, and four. The tree is formed by examining the significance information at various depths. At depth one, the significance information is taken as a whole and is examined to determine if any of the entries are significant. In this case, both $s^3(c_{1,1})$ and $s^3(c_{4,3})$ are one indicating that $c_{1,1}$ and $c_{4,3}$ are significant. As a result, the root or node 26 is labeled with a one. At depth two, the significance information is broken into four quadrants and each quadrant is examined to determine if any of the entries in that quadrant are significant. In this case, the upper left quadrant has significant entries. As a result, node 28 is labeled with a one and nodes 30-34 are labeled with a zero. At depth three, each significant quadrant from depth two is broken into four sub-quadrants and each sub-quadrant is examined to determine if any of the entries are significant. In this case, the upper left sub-quadrant and the lower right sub-quadrant have significant entries. As a result, nodes 36 and 42 are labeled with a one and nodes 38 and 40 are labeled with a zero. At depth four, each significant sub-quadrant from depth three is broken down into four sub-sub-quadrants and each sub-sub-quadrant is examined to determine if any of the entries are significant. In this case, $s^3(c_{1,1})$, the upper left sub-sub-quadrant of the upper left sub-quadrant, and $s^3(c_{4,3})$, the lower left sub-sub-quadrant of the lower right sub-quadrant, are significant. As a result, nodes 44 and 72 are labeled with a one and nodes 46–50, 68, 70 and 74 are labeled with a zero. No further division of the significance information is possible, so the tree is complete. The final tree has root node 26, branch nodes 28, 36, and 42, and leaf nodes 30–34, 38, 40, 44–50, and 68–74. The positive sign [+] of $c_{1,1}$ has been noted under node 44 and the negative sign [−] of $c_{4,3}$ has been noted under node 72 as reminders to code the signs accordingly before coding nodes 44 and 72 themselves.

In FIG. 5C a table illustrating the encoding of the significance information and the refinement information for FIGS. 5A and 5B is shown. Recall from above that the significance tree $T_n$ should be described in a bottom-up-depth-first fashion. Realize also that for the highest bit-plane m−1 the entire tree must be described. For convenience, the tree is described from left to right as drawn. Once described, a node is not redescribed. For instance, the root is only described once but is connected ultimately to all of the leaves. In this case, the order of the description is 26, 28, 36, 44–50, 38–42, 68–74, and 30–34. The resulting encoding of significance information $\Delta_3$ is shown in the table. Remember that the sign of the corresponding coefficient is encoded with the first significant bit for that coefficient. Here, for example, the binary values of the positive and negative signs have been shown in square brackets for ease of identification, but no such bracket would be transmitted. Recall further from above that $R_{m−1}$ is always an empty set. So, $R_3$ is an empty set in this example. Accordingly, after encoding of the highest bit-plane of the coefficients from FIG. 3, the SNR scalable bit-stream consists of $\Delta_3 R_3$ where $R_3$ is an empty set.

Figure 6B:
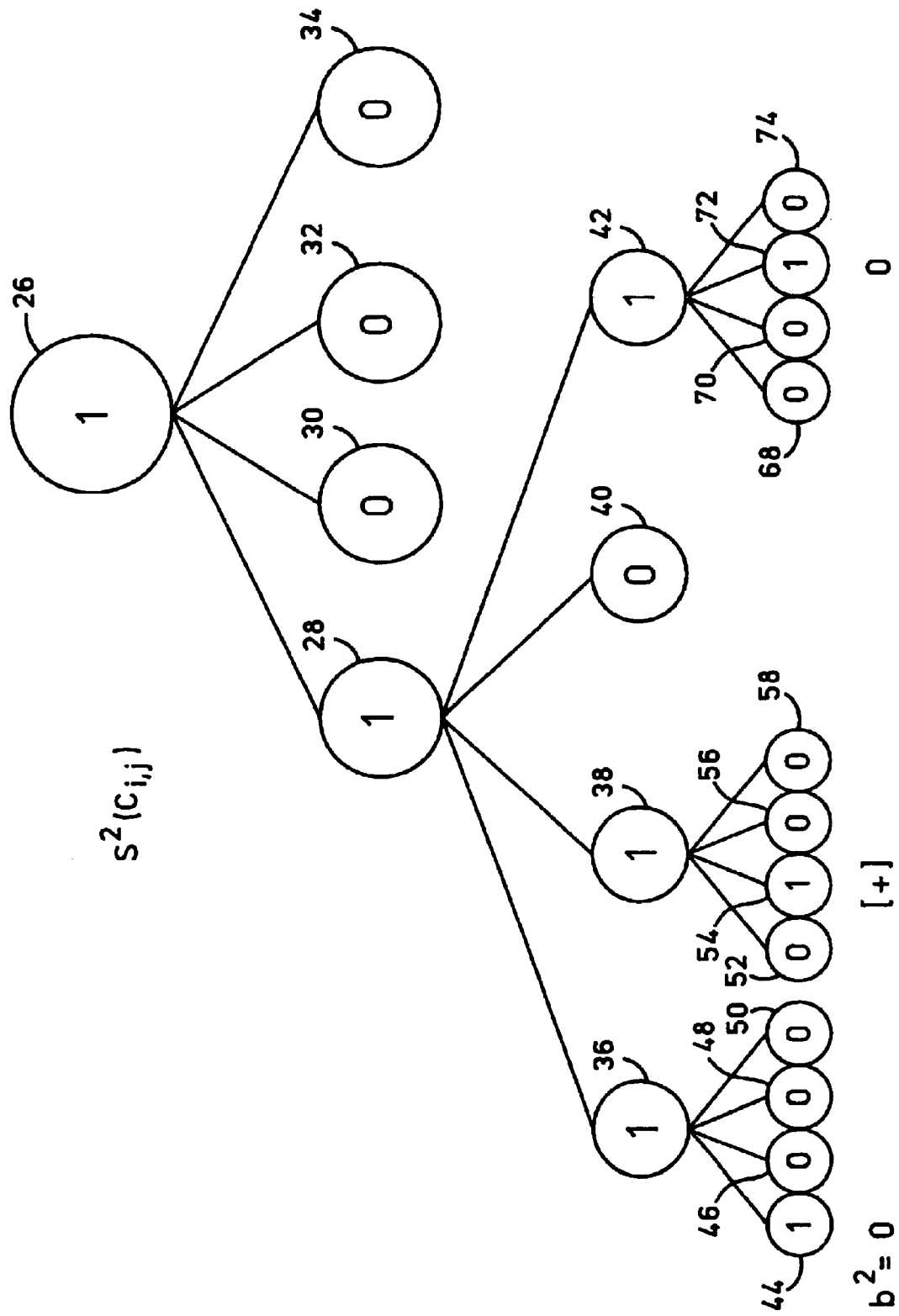
FIG. 6B is a quad-tree description of the square array of significance information of FIG. 6A.

With reference to FIG. 6A, there is shown an example of a square array of significance information for the second highest bit-plane of the coefficients from FIG. 3 Recall from above that the coefficient remains significant at all bit-planes below its initial significance. So, $s^2(c_{1,1})$ and $s^2(c_{4,3})$ are one because $s^3(c_{1,1})$ and $s^3(c_{4,3})$, respectively, were one. In addition, newly significant at this bit-plane is $s^2(c_{1,4})$ because bit $b^2$ for coefficient $c_{1,4}$ is significant. A quad-tree description of the square array of significance information of FIG. 6A is shown in FIG. 6B. The resulting tree is still of depth four with most of the leaves at depth four, one of the leaves at depth three, and three of the leaves at depth two. The tree is formed by examining the significance information at the same depths as FIG. 5B above. At depth one, the significance information is the same as FIG. 5B. As a result, the root is labeled with a one. At depth two, the significance information is the same as FIG. 5B. As a result, node 28 is labeled with a one and nodes 30–34 are labeled with a zero. At depth three, the significance information is the same as FIG. 5B with one addition. In this case, the upper right sub-quadrant also has a significant entry. As a result, nodes 36, 38, and 42 are labeled with a one and node 40 is labeled with a zero. At depth four, the upper right sub-quadrant from depth three is broken into four sub-sub-quadrants and each sub-sub-quadrant is examined to determine if any of the entries are significant. In this case, $s^2(c_{1,4})$, the upper right sub-sub-quadrant of the upper right sub-quadrant, is one. As a result, nodes 44, 54, and 72 are labeled with a one and nodes 46–52, 56, 58, 68, 70, and 74 are labeled with a zero. The final tree has root node 26, branch nodes 28, 36, 38, and 42, and leaf nodes 46–50, 52, 56, 58, 68, 70, 74, 40, and 30–34. The values for bits $b^2$ for coefficients $c_{1,1}$ and $c_{4,3}$ have been noted under nodes 44 and 72, respectively, for future reference when coding the refinement information.

Figure 6C:
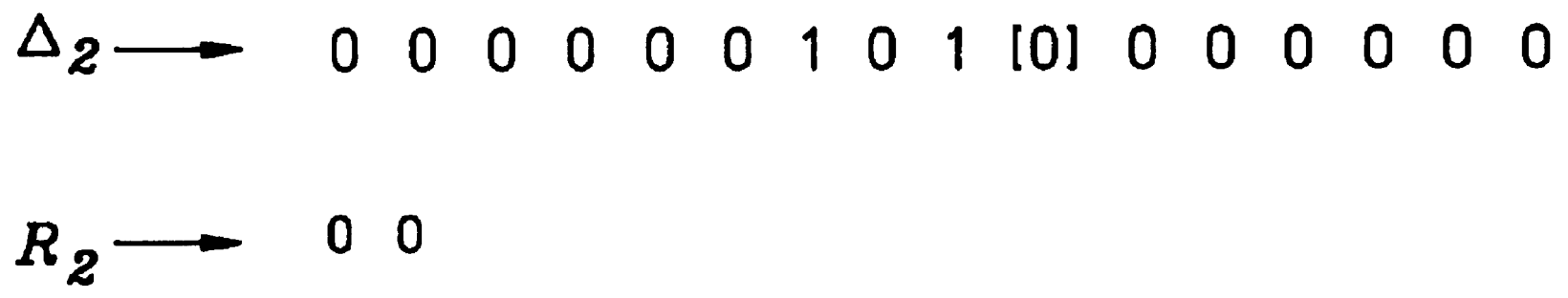

Turning now to FIG. 6C, a table illustrating the encoding of the significance information and the refinement information for FIGS. 6A and 6B is shown. Because the coefficient remains significant at all bit-planes below its initial significance, the nodes of the tree that are labeled with a one will remain a one. As a result, below the highest bit-plane only the zero labeled nodes of the next higher tree are of interest. The other nodes can be ignored because they are known and have been described previously. In this case, only nodes 46–50, 68, 70, 74, 38, 40 and 30–34 of FIG. 5B are of interest for coding the new status of the leaf nodes of the tree of FIG. 6B. Describing the significance information from left to right and in a bottom-up-depth-first fashion, nodes 46–50 remain unchanged. Nodes 68, 70, and 74 also remain unchanged. Moving up to depth three, node 38 changes to being significant, as a result, nodes 52–58 must be described for the first time. Also, node 40 remains unchanged. Moving up to depth two, nodes 30–34 remain unchanged. The resulting order of the description is 46–50, 68, 70, 74, 38, 52–58, 40, and 30–34. The resulting encoding of the new status of these nodes $\Delta_2$ is shown in the table. Recall from above that for each bit-plane below the highest bit-plane, the values of the coefficients which became significant at higher bit-planes are refinement information and its encoding is represented by $R_n$. For convenience, the refinement information is described from left to right. In this case, the values for bits $b^2$ for coefficients $c_{1,1}$ and $c_{4,3}$ make up refinement information $R_2$ as shown in the table. Accordingly, after encoding of the two highest bit-planes of the coefficients from FIG. 3, the SNR scalable bit-stream consists of $\Delta_3 R_3 \Delta_2 R_2$.

Figure 7B:
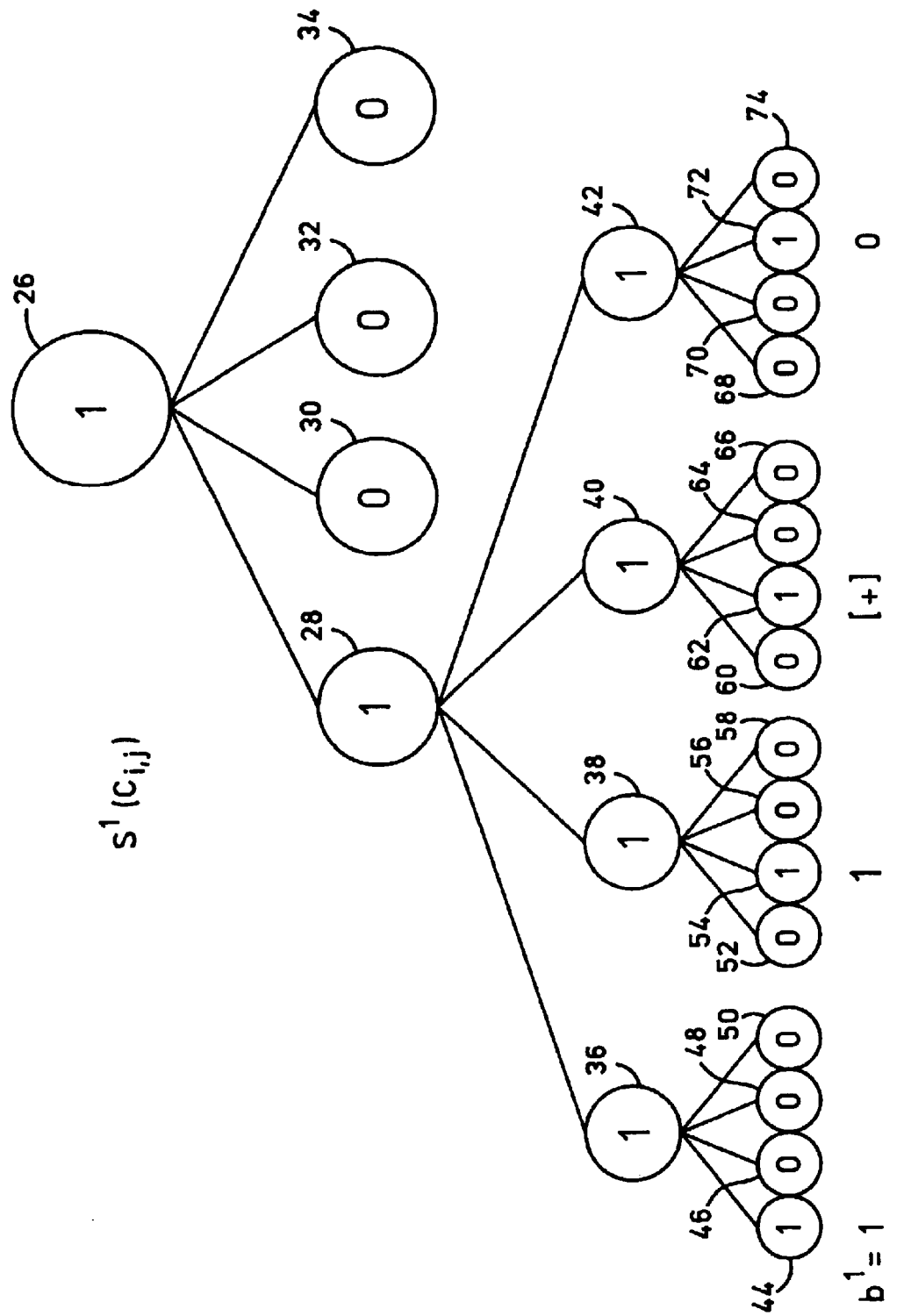
FIG. 7B is a quad-tree description of the square array of significance information of FIG. 7A.

FIG. 7A shows an example of a square array of significance information for the third highest bit-plane of the coefficients from FIG. 3. In addition to the coefficients that remain significant from above, newly significant at this bit-plane is $c_{3,2}$ because bit $b^1$ for coefficient $c_{3,2}$ is one and all higher bits are zero. A quad-tree description of the square array of significance information of FIG. 7A is shown in FIG. 7B. The resulting tree is still of depth four with most of the leaves at that depth and three of the leaves at depth two. At depths one and two, the significance information is the same as FIG. 6B At depth three, the significance information is the same as FIG. 6B with one addition. In this case, the lower left sub-quadrant also has a significant entry. As a result, nodes 36–42 are labeled with a one. At depth four, the lower left subquadrant from depth three is broken into four sub-sub-quadrants and each sub-sub-quadrant is examined to determine if any of the entries are significant. In this case, $s^1(c_{3,2})$, the upper right sub-sub-quadrant of the lower left sub-quadrant, is one. As a result, nodes 44, 54, 62, and 72 are labeled with a one and nodes 46–52, 56–60, 64–70, and 74 are labeled with a zero. The final tree has root node 26, branch nodes 28 and 36–42, and leaf nodes 44–74 and 30–34. As above, the values for bits $b^1$ for coefficients $c_{1,1}$, $c_{1,4}$, and $c_{4,3}$ have been noted under nodes 44, 54, and 72, respectively, for future reference when coding the refinement information.

Turning now to FIG. 7C, a table illustrating the encoding of the significance information and the refinement information for FIGS. 7A and 7B is shown. Recall from above that below the highest bit-plane only the zero labeled nodes of the next higher tree are of interest. In this case, only nodes 46–52, 56, 58, 68, 70, 74, 40, and 30–34 of FIG. 6B are of interest for coding significance information for FIG. 7B. Describing the significance information from left to right and in a bottom-up-depth-first fashion, nodes 46–52, 56, 58, 68, 70, and 74 remain unchanged. Moving up to depth three, node 40 changes to being 40 significant, as a result, nodes 60–66 must be described for the first time. Moving up to depth two, nodes 30–34 remain unchanged. The resulting order of the description is 46–52, 56, 58, 68, 70, 74, 40, 60–66, and 30–34. The resulting significance information $\Delta_1$ are shown in the table. Because for each bit-plane below the highest bit-plane, the values of the coefficients which became significant at higher bit-planes are encoded as refinement information, in this case, the values for bits $b^1$ for coefficients $c_{1,1}$, $c_{1,4}$, and $c_{4,3}$ make up the refinement information $R_1$ as shown in the table. Accordingly, after encoding of the three highest bit-planes of the coefficients from FIG. 3, the SNR scalable bit-stream consists of $\Delta_3$ $R_3$ $\Delta_2$ $R_2$ $\Delta_1$ $R_1$.

Figure 8B:
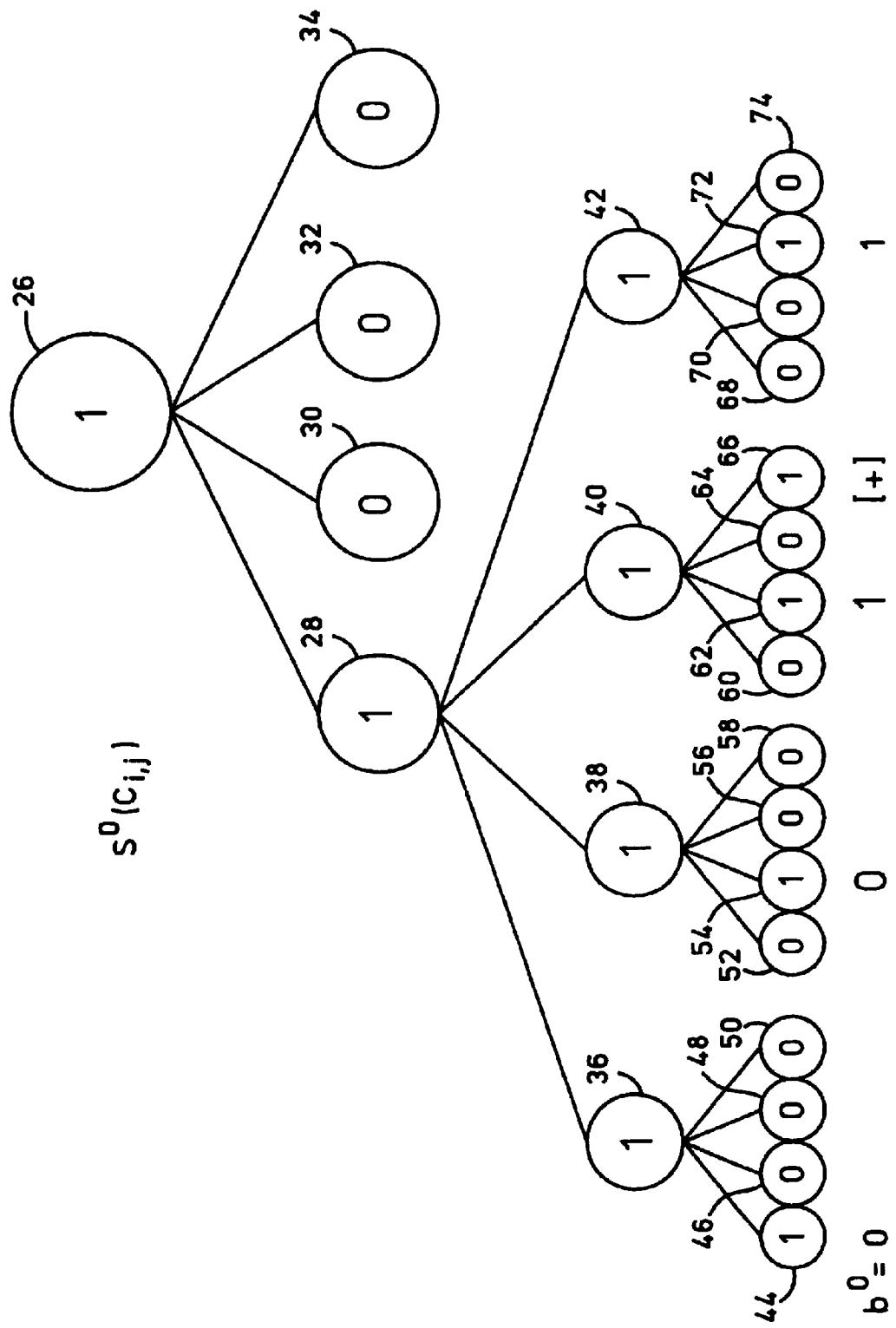
FIG. 8B is a quad-tree description of the square array of significance information of FIG. 8A.

FIG. 8A shows an example of a square array of significance information for the lowest bit-plane of the coefficients from FIG. 3. In addition to the coefficients that remain significant from above, newly significant at this bit-plane is $s^0(c_{4,2})$ because bit $b^0$ for coefficient $c_{4,2}$ is one. A quad-tree description of the square array of significance information of FIG. 8A is shown in FIG. 8B. The resulting tree is still of depth four with most of the leaves at that depth and three of the leaves at depth two. At depths one, two, and three, the significance information is the same as FIG. 7B. At depth four, the four sub-sub-quadrants of the lower left sub-quadrant from depth two are examined to determine if any of the entries are significant. In this case, $s^0(c_{4,2})$ the lower right sub-sub-quadrant of the lower left sub-quadrant, is now also significant. As a result, nodes 44, 54, 62, 66, and 72 are labeled with a one and nodes 46–52, 56–60, 64, 68, 70, and 74 are labeled with a zero. The final tree still has root node 26, branch nodes 28 and 36–42, and leaf nodes 44–74 and 30–34. As above, the values for bits $b^0$ for coefficients $c_{1,1}$, $c_{1,4}$, $c_{3,2}$, and $c_{4,3}$ have been noted under nodes 44, 54, 62, and 72, respectively, for future reference when coding the refinement information.

In FIG. 8C is depicted a table illustrating the encoding of the significance information and the refinement information for FIGS. 8A and 8B. Because below the highest bit-plane only the zero labeled nodes of the next higher tree are of interest, in this case, only nodes 46–52, 56–60, 64–70, 74, and 30–34 of FIG. 7B are of interest for coding significance information for FIG. 8B. Describing the significance information from left to right and in a bottom-up-depth-first fashion, nodes 46–52, 56–60, 64, 68, 70, 74, and 30–34 remain unchanged. Node 66 changes to being significant. The resulting order of the description is 46–52, 56–60, 64–70, 74, and 30–34. The resulting significance information $\Delta_0$ is shown in the table. In this case, the values for bits $b^0$ for coefficients $c_{1,1}$, $c_{1,4}$, $c_{3,2}$, and $c_{4,3}$ make up refinement information $R_0$ as shown in the table. Accordingly, after encoding all of the bit-planes of the coefficients from FIG. 3, the SNR scalable bit-steam consists of $\Delta_3$ $R_3$ $\Delta_2$ $R_2$ $\Delta_1$ $R_1$ $\Delta_0$ $R_0$.

Although presented in the context of compression of image data, one of ordinary skill in the art will realize that the method described above will apply to any coding of the bit-planes of an array of numbers. In addition, such skilled persons will realize that the encoding of significance information $\Delta_n$ and refinement information $R_n$ may be further compressed using Huffman coding or context based arithmetic coding. While the invention has been illustrated and described by means of specific embodiments, it is to be understood that numerous changes and modifications may be made therein without departing from the spirit and scope of the invention as defined in the appended claims and equivalents thereof.

What is claimed is:

1. A method for coding a set of numbers represented by a set of bit-planes having an arrangement between a highest and a lowest significance, comprising the step of generating a bit stream that describes a current one of the bit-planes in terms of a tree structure having a hierarchical arrangement of leaves such that the leaves of the tree structure are described in the bit stream in an order that is determined by an arrangement of zero values in a tree structure for the bit-plane having a next higher significance wherein the step of generating a bit stream comprises the step of generating the bit stream such that each leaf in a maximum depth of the tree structure for the current one of the bit-planes that corresponds to a leaf having a zero value in the tree structure for the bit-plane having the next higher significance is described in the bit stream before the leaves of the tree structure for the current one of the bit-planes that do not have a corresponding leaf in the tree structure for the bit-plane having the next higher significance.

2. The method of claim 1, wherein the leaves of the tree structure for the current one of the bit-planes that do not have the corresponding leaves in the tree structure for the bit-plane having the next higher significance are described before each leaf in a shallow depth of the tree structure for the current one of the bit-planes that corresponds to a leaf having a zero value in the tree structure for the bit-plane having the next higher significance.

3. The method of claim 1, wherein the step of generating a bit stream comprises the step of generating a set of significance information in response to the tree structure for the current one of the bit-planes.

4. The method of claim 3, wherein the step of generating a bit stream further comprises the step of concatenating a set of refinement information with the significance information.

5. The method of claim 4, wherein the refinement information follows the significance information in the bit stream.

6. The method of claim 5, wherein the refinement information follows the significance information and precedes a set of significance information for a next lower one of the bit-plane having a next lower significance.

7. A coding system, comprising:
   filter that generates a set of coefficients in response to an input image, the coefficients represented by a set of bit-planes having an arrangement between a highest and a lowest significance;
   encoder that generates a compressed image for the input image by generating a bit stream that describes each bit-plane in terms of a tree structure having a hierarchical arrangement of leaves such that the leaves of the tree structure are described in the bit stream in an order that is determined by an arrangement of zero values in a tree structure for the bit-plane having a next higher significance wherein the encoder generates the bit stream such that each leaf in a maximum depth of the tree structure for a current one of the bit-planes that corresponds to a leaf having a zero value in the tree structure for the bit-plane having the next higher significance is described in the bit stream before the leaves of the tree structure for the current one of the bit-planes that do not have a corresponding leaf in the tree structure for the bit-plane having the next higher significance.

8. The coding system of claim 7, wherein the encoder describes the leaves of the tree structure for the current one of the bit-planes that do not have the corresponding leaves in the tree structure for the bit-plane having the next higher significance before describing each leaf in a shallow depth of the tree structure for the current one of the bit-planes that corresponds to a leaf having a zero value in the tree structure for the bit-plane having the next higher significance.

9. The coding system of claim 7, wherein the encoder generates a set of significance information in response to the tree structure for each of the bit-planes.

10. The coding system of claim 9, wherein the encoder concatenates a set of refinement information with the significance information.

11. The coding system of claim 10, wherein the refinement information follows the significance information in the bit stream.

12. An apparatus for coding a set of numbers represented by a set of bit-planes having an arrangement between a highest and a lowest significance, comprising means for generating a bit stream that describes a current one of the bit-planes in terms of a tree structure having a hierarchical arrangement of leaves such that the leaves of the tree structure are described in the bit stream in an order that is determined by an arrangement of zero values in a tree structure for the bit-plane having a next higher significance wherein the means for generating a bit stream comprises means for generating the bit stream such that each leaf in a maximum depth of the tree structure for the current one of the bit-planes that corresponds to a leaf having a zero value in the tree structure for the bit-plane having the next higher significance is described in the bit stream before the leaves of the tree structure for the current one of the bit-planes that do not have a corresponding leaf in the tree structure for the bit-plane having the next higher significance.

13. The apparatus of claim 12, wherein the leaves of the tree structure for the current one of the bit-planes that do not have the corresponding leaves in the tree structure for the bit-plane having the next higher significance are described before each leaf in a shallow depth of the tree structure for the current one of the bit-planes that corresponds to a leaf having a zero value in the tree structure for the bit-plane having the next higher significance.

14. The apparatus of claim 12, wherein the means for generating a bit stream comprises means for generating a set of significance information in response to the tree structure for the current one of the bit-planes and means for concatenating a set of refinement information with the significance information.

* * * * *